United States Patent Office 3,726,829
Patented Apr. 10, 1973

3,726,829
INTUMESCENT POLYMER COMPOSITIONS
FOR ROCKETS
David C. Sayles, Huntsville, Ala., assignor to the United States of America as represented by the Secretary of the Army
No Drawing. Filed Nov. 10, 1970, Ser. No. 88,481
Int. Cl. C08c 11/08, 11/10, 11/16
U.S. Cl. 260—41.5 R     10 Claims

ABSTRACT OF THE DISCLOSURE

This invention pertains to chemical compositions useful in thermal barriers of a solid-propelled rocket motor which provides zoning capability for a missile. Flame resistant chemical compositions which intumesce are employed in the inert elastomeric barrier that is embedded between layers of solid propellant. Disclosed are intumescent chemical compositions useful as thermal barriers and additives to rocket motor case insulation and liner materials. The disclosed typical intumescent compositions are comprised of ammonium dihydrogen phosphate, boric acid, a filler material selected from asbestos or starch and tragacanth, a titanium oxide composition selected from titanium dioxide and titanium dioxide-barium sulfate, and a resin.

BACKGROUND OF THE INVENTION

A single grain solid propellant rocket motor, when ignited, will burn until all the propellant is consumed, unless extinguished. Extinguishment of solid grain has been accomplished under certain conditions, but generally with difficulty. A grain such as a hybrid grain, has the capability of burning so long as a needed liquid oxidizer is injected into the combustion chamber or case containing the grain. The hybrid rocket motor design permits incremental-thrust; however, more elaborate equipment including pumps, valves, pressure sensitive devices, timing devices, etc., are required which complicates the design, manufacture and the use of this type propulsion system.

In order to avoid use of a dual system (e.g., liquid oxidizer-solid fuel), rocket motors of the solid type have been provided with concentric layers of propellant separated with an inert barrier or with section of propellants which are positioned in another arrangement such as side by side and separated by an inert barrier. The inert barrier is to partition the total impulse of the rocket motor into increments so that zoning of the missile can be achieved. The inert barrier to be effective must, therefore, terminate combustion when the flame front of the burning propellant reaches the barrier. The barrier should also provide an insulating effect to prevent the ignition of a second increment of propellant.

After a first increment of propellant is consumed, a gas generator can be fired and its exhaust products function to remove the inert barrier and ignite the second layer of propellant. The process can be repeated in accordance with the design and the number of firings desired for a predetermined zoning effect for a missile.

Difficulty has been encountered in effective removal of the inert barrier. For example, in the more recent design of the motor grains which contain concentric layers of propellant, the inert barrier has not functioned acceptably because its uniform removal has not been attained and as a consequence, irregular and poor ignition of the second zone of propellant has occurred.

Difficulty has also been encountered in preventing reignition of a quenched solid propellant grain of a rocket motor.

A material which could be used as an effective inert barrier would be desirable. Also advantageous would be a material which would facilitate the removal process of a thermal barrier.

A material useful as an additive to the liner or insulation material for a quenchable rocket motor grain, which usefulness relates to preventing reignition of a quenched solid propellant grain, would be of great value.

Therefore an object of this invention is to provide a composition which serves as a thermal barrier for a solid propellant grain.

Another object of this invention is to provide a composition which facilitates barrier removal from a propellant grain.

A further object of this invention is to provide a composition which serves as an additive to the liner or insulation material to prevent reignition of a quenched solid propellant grain.

SUMMARY OF THE INVENTION

The use of intumescent chemicals (property of swelling or puffing when exposed to the heat of a flame) as the thermal barrier between layers of a propellant grain serves to inhibit heat transfer, serves to assist barrier removal, and serves to provide an insulating layer with a cooling media for the flame temperature. A typical intumescent chemical composition of this invention for use in thermal barriers is comprised of resins (e.g., formed from a selected prepolymer of polyetheralcohols, carboxyl-terminated polybutadiene, hydroxyl-terminated polybutadiene, and polybutadiene acrylic acid cross-linked with an appropriate crosslinking agent), ammonium dihydrogen phosphate, boric acid, a filler material selected from asbestos and a composition constituted of starch about 7 parts and of gum tragacanth about 1 part, and a titanium oxide composition selected from titanium dioxide and titanium dioxide-barium sulfate.

The intumescent chemical composition when incorporated into a propellant liner or insulation material serves to prevent reignition of a quenchable grain which has been quenched to extinguish the burning thereof.

DESCRIPTION OF THE PREFERRED EMBODIMENTS

Propellant grains which are employed for zoning capability are enhanced by utilizing the intumescent chemical compositions of this invention between the propellant layers. A preferred intumescent chemical composition for use on a hydroxyl-terminated polybutadiene-based propellant grain is comprised of the ingredients listed in Example I, in percent by weight.

EXAMPLE I

| Preferred range percent by weight | Ingredients | Percent by weight |
|---|---|---|
| 56–70 | Ammonium dihydrogen phosphate $NH_4H_2PO_4$ | 63 |
| 2–15 | Boric acid | 10 |
| 2–6 | Titanium oxide composition (titanium dioxide) | 4 |
| 20–30 | Resin (hydroxyl-terminated polybutadiene prepolymer 21.5 parts crosslinked with dimeryl diisocyanate 1.5 parts). | 23 |
| 0–10 | Optional: Filler material additive (e.g., asbestos or starch and gum tragacanth). | |

An intumescent chemical composition which is preferable for use as a thermal barrier for a crosslinked nitrocellulose type propellant is comprised of the ingredients listed in Example II, in percent by weight.

EXAMPLE II

| Preferred range percent by weight | Ingredients | Percent by Weight |
|---|---|---|
| 56–70 | Ammonium dihydrogen phosphate $NH_4H_2PO_4$ | 61 |
| 2–15 | Boric acid | 2 |
| 0–10 | Filler additive material selected from asbestos and a composition constituted of about 7 parts starch and about 1 part gum tragacanth. | 8 |
| 2–6 | Titanium oxide composition (titanium dioxide-barium sulfate). | 4 |
| 20–30 | Resin | 25 |

The chemical ingredients are incorporated into the resin (e.g., functionally-terminated polybutadiene or other similar binder resins) by conventional mix techniques, such as, roller mill.

The ratio of chemicals-to-resin can be varied widely, from a ratio of about 4 to 1 to about 1 to 4 (i.e., resin comprises from about 20 to about 80 percent by weight of composition.

The efficacy of the intumescent composition of this invention to reduce heat diffusion through the thermal barrier can be enhanced by incorporating asbestos fibers as an additive to the intumescent chemical composition. A composition of about 7 parts starch and 1 part gum tragacanth is likewise usable as an additive or in the basic formulation as illustrated earlier.

The resins which are recommended for use in the thermal barrier formulation are the same as those used in the propellant. For example, if the propellant is a composite, aluminized, ammonium perchlorate-oxidized, carboxy-terminated polybutadiene propellant, then from the standpoint of maximum compatibility and adhesion, the preferred resin is carboxyl-terminated polybutadiene. A variety of other resins are also usable for this application. When the intumescent chemical composition is used as an additive to liner or insulation materials, the selection of ingredients can be made to cover a wider variance. The compatibility of the resin is not as critical, and the composition can include filler materials which may be less desirable if utilized between propellant layers in a thermal barrier.

A propellant composition, as set forth in Table I, below, would preferably use the intumescent composition with a resin comprised of carboxyl-terminated polybutadiene.

TABLE I

| Function | Ingredient | Composition A, percent by weight |
|---|---|---|
| Oxidizer | Ammonium perchlorate | 68.0 |
| Metal fuel | Aluminum | 14.0 |
| Catalyst | n-Butylferrocene | 7.0 |
| Binder | Carboxyl-terminated polybutadiene prepolymer. | 10.5 |
| Crosslinker | Tris(methyaziridinyl)phosphine oxide | 0.5 |
| Curatives | Tris(oxiranyl)-para-aminophenol iron linoleate. | |
| Total | | 100.0 |

When the formulation of Table I is contained in a missile designed for zoning capability, a segment or layer of the propellant would be coated or separated from a second layer by a thin layer of intumescent composition. When the first layer of propellant burns to the separating intumescent layer, heat causes a swelling or puffing of the layer with the following effects:

(a) These chemical ingredients intumesce, and thus increase the thickness of the barrier, and inhibit the transfer or conduction of heat across it and into the second zone of propellant.

(b) Because of the swelling or puffing action of these chemical ingredients, a highly irregular surface is produced on the interior and outer surface of the barrier, and the removal of the barrier is achieved much more readily because it protrudes into the stream of the exhaust gases from the gas generator and disrupt the laminar flow so that it becomes turbulent.

(c) These chemical ingredients, on exposure to heat, undergo fusion and release smothering gases which cool the flame. Some flame temperature reduction occurs because they undergo a change in physical state.

(d) The swelling or puffing action provides a thick, cellular insulating layer between the flame and the flammable propellant substrate.

The effects described above directly influence the actions required for zoning capability of a missile. Not only must the ignition of a second layer (before the desired time) be prevented, an assist to barrier removal, particularly as a result of the effect under (b) above, is very important to ensure efficient removal and ignition of a second propellant layer at the desired time. The ignition of the second propellant layer would provide for additional thrust and burning time for a missile. In accordance with the desired design, a missile can be programmed for a number of burns for variable ranges and multimission functions.

The thermal barrier comprised of ammonium dihydrogen phosphate, boric acid, titanium dioxide, hydroxyl-terminated polybutadiene prepolymer, and dimeryl diisocyanate is applied in a thin layer (3–10 mils) between propellant grain layers or segments. Although the layer of intumescent chemicals is considerably thinner than films usually used for termination of burning, termination of burning is very effective. The uniformity of application is not regarded as being critical, and ability to terminate burning is almost completely independent of film thickness. For example, reliable termination of burning also takes place even when the barrier has acquired some liquid burning rate modifier through migration from the propellant. This is particularly significant with the increasing trend toward the use of such catalysts in more recent propellant formulations.

The barrier is easily applied to the propellant surface by spraying using a conventional spray gun, typical of the surface coating industry.

The barrier bonds readily to the cured propellant, and the propellant bonds readily to the barrier when the resin in the propellant and barrier are properly selected as noted earlier herein. For example, the testing of the above barrier composition containing hydroxyl-terminated polybutadiene resin is accomplished by applying to a grain having a crosslinked hydroxyl-terminated polybutadiene resin binder.

The time for barrier removal is reduced from 250 milliseconds to 25 milliseconds when intumescent chemical barrier composition is utilized as compared to a conventional barrier composition. The completeness of barrier removal is significantly improved for the intumescent barrier when protruding surfaces extended into the stream of exhaust gases, thus causing the flow of gases to become turbulent in the vicinity of the surface of the barrier.

In addition to the inert barrier function of the intumescent chemical composition, it has been found that the composition is also useful as an additive to the propellant of a controllable solid rocket motor which is designed for start-stop-restart of the combustion of the propellant. Spontaneous reignition of the snuffed, partially-burned grain is prevented which is essential for proper operation of the controllable solid propellant rocket motor. The quantity of additive utilized is not critical, and the desired quantity is readily determined by experience in use.

The intumescent formulations of this invention also improve the efficacy of liner or insulation materials of rocket motors which do not necessarily contain a quenchable grain. The selection of formulation is determined for greater compatibility with curable liner of insulation as suggested in preferred choice for the thermal barrier use. Since the intumescent chemical composition is utilized as an additive to the liner or insulation material rather than for bonding directly to it, more variance in compatibility can be tolerated. The intumescent chemical composition with or without filler material additive improves the capability of the liner or insulation material similarly as the effects provided by the thermal barrier used between propellant layers.

I claim:

1. An intumescent chemical composition for use in thermal barriers of a solid-propelled rocket motor of the type which provides zoning capability for a missile, said composition comprised of ammonium dihydrogen phosphate, boric acid, titanium oxide composition, and a resin formed from an ingredient selected from a prepolymer of polyetheralcohol, carboxyl-terminated polybutadiene, hydroxyl-terminated polybutadiene, and polybutadiene acrylic acid crosslinked with an appropriate crosslinking agent.

2. The composition of claim 1 and wherein said resin comprises from about 20 to about 80 percent by weight of said composition.

3. The composition of claim 1 and wherein said titanium oxide composition is titanium dioxide; said resin is formed from hydroxyl-terminated polybutadiene prepolymer crosslinked with dimeryl diisocyanate.

4. The composition of claim 3 wherein said ammonium dihydrogen phosphate is present in an amount from about 56 to about 70 percent by weight; said boric acid is present in an amount from about 2 to about 15 percent by weight; said titanium dioxide is present in an amount from about 2 to about 6 percent by weight; and said resin is present in an amount from about 20 to about 30 percent by weight, said resin being formed from said hydroxyl-terminated polybutadiene prepolymer of about 21.5 parts and dimeryl diisocyanate of about 1.5 parts.

5. The composition of claim 4 and wherein said ammonium dihydrogen phosphate is present in an amount of about 63 percent by weight; said boric acid is present in an amount of about 10 percent by weight; said titanium dioxide is present in an amount of about 4 percent by weight; and said resin is present in an amount of about 23 percent by weight.

6. The composition of claim 5 and wherein said composition includes a filler material additive of asbestos in an amount up to about 10 percent by weight of the other combined ingredients.

7. The composition of claim 1 and wherein said titanium oxide composition is titanium dioxide-barium sulfate.

8. The composition of claim 7 and wherein said ammonium dihydrogen phosphate is present in an amount from about 56 to about 70 percent by weight; said boric acid is present in an amount from about 2 to about 15 percent by weight; said titanium dioxide-barium sulfate is present in an amount from about 2 to about 6 percent by weight; and said resin is present in an amount from about 20 to about 30 percent by weight.

9. The composition of claim 8 and wherein said composition additionally includes a filler material additive selected from asbestos and a composition constituted of about 7 parts starch and of about 1 part gum tragacanth, said filler material additive being used in amounts up to about 10 percent by weight of the other combined ingredients.

10. The composition of claim 9 and wherein said ammonium dihydrogen phosphate is present in an amount of about 61 percent by weight; said boric acid is present in an amount of about 2 percent by weight; said titanium dioxide-barium sulfate is present in an amount of about 4 percent by weight; said resin is present in an amount of about 25 percent by weight; and wherein said filler material additive selected is a composition constituted of about 7 parts starch and about 1 part gum tragacanth, said filler material additive being used in an amount of about 8 percent by weight of the total composition weight.

References Cited

UNITED STATES PATENTS

| | | | |
|---|---|---|---|
| 2,875,044 | 2/1959 | Dunn et al. | 117—137 X |
| 3,433,158 | 3/1969 | Pierce | 102—103 |
| 3,446,018 | 5/1969 | MacBeth | 102—103 X |
| 3,449,161 | 6/1969 | Hindersinn et al. | 260—41 RX |

LELAND A. SEBASTIAN, Primary Examiner

U.S. Cl. X.R.

102—103; 149—7, 19, 44; 260—37 R, 37 N, 41 R, 41 A, 41 B, 41.5 A